United States Patent
Sheridan et al.

(10) Patent No.: US 8,276,275 B2
(45) Date of Patent: Oct. 2, 2012

(54) METHOD FOR ASSEMBLING AN EPICYCLIC GEAR TRAIN

(75) Inventors: William G. Sheridan, Southington, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 357 days.

(21) Appl. No.: 12/718,436

(22) Filed: Mar. 5, 2010

(65) Prior Publication Data

US 2010/0154217 A1    Jun. 24, 2010

Related U.S. Application Data

(62) Division of application No. 11/481,112, filed on Jul. 5, 2006, now Pat. No. 7,704,178.

(51) Int. Cl.
*B21K 1/30* (2006.01)
(52) U.S. Cl. .......... 29/893.1; 464/79; 475/159; 475/331
(58) Field of Classification Search ................. 29/893.1, 29/525.14, 557; 74/468; 184/6.12; 464/79; 475/159, 331, 346, 347
See application file for complete search history.

(56) References Cited

U.S. PATENT DOCUMENTS

| | | | |
|---|---|---|---|
| 2,591,743 A | 4/1952 | Thompson | |
| 3,650,353 A | 3/1972 | Abbott | |
| 3,853,432 A | 12/1974 | Cronstedt | |
| 4,271,928 A | 6/1981 | Northern | |
| 4,378,711 A | 4/1983 | Daniel | |
| 4,827,712 A | 5/1989 | Coplin | |
| 4,914,904 A | 4/1990 | Parnes et al. | |
| 5,391,125 A | 2/1995 | Turra et al. | |
| 5,433,674 A | 7/1995 | Sheridan et al. | |
| 5,466,198 A | 11/1995 | McKibbin et al. | |
| 5,472,383 A | 12/1995 | McKibbin | |
| 6,158,210 A | 12/2000 | Orlando | |
| 6,223,616 B1 * | 5/2001 | Sheridan | 74/468 |
| 7,011,599 B2 | 3/2006 | Becquerelle et al. | |
| 7,033,301 B2 | 4/2006 | Kimes | |

(Continued)

FOREIGN PATENT DOCUMENTS

DE    3410977 A1    9/1985

(Continued)

OTHER PUBLICATIONS

Extended European Search Report for Application No. EP 07 25 2647 dated Jan. 25, 2011.

*Primary Examiner* — Richard Chang
(74) *Attorney, Agent, or Firm* — Carlson, Gaskey & Olds, P.C.

(57) ABSTRACT

A method is disclosed of assembling an epicyclic gear train comprising providing a carrier that includes spaced apart walls and circumferentially spaced mounts interconnecting the walls in a one-piece unitary structure. Spaced apart apertures are provided between the mounts at an outer circumference of the carrier. Gear pockets are provided between the walls and mounts extending to the apertures, and a central opening is provided in at least one of the walls. An intermediate gear is inserted through the central opening. The intermediate gear moves radially into the gear pocket to extend through the aperture. A baffle is inserted into the carrier in a space between the walls. A sun gear is inserted through the central opening to intermesh with the intermediate gear.

5 Claims, 5 Drawing Sheets

U.S. PATENT DOCUMENTS

| | | |
|---|---|---|
| 7,104,918 B2 | 9/2006 | Mitrovic |
| 7,112,157 B2 | 9/2006 | Uebbing |
| 7,214,160 B2 | 5/2007 | Illerhaus |
| 7,490,460 B2 | 2/2009 | Moniz et al. |
| 2009/0111639 A1 | 4/2009 | Klingels |

FOREIGN PATENT DOCUMENTS

| | | |
|---|---|---|
| JP | 6-1889 | 1/1994 |
| JP | 2001-208146 | 8/2001 |
| JP | 2005-163666 | 6/2005 |
| JP | 2005-207472 | 8/2005 |

* cited by examiner

METHOD FOR ASSEMBLING AN EPICYCLIC GEAR TRAIN

This application is a divisional application of U.S. patent application Ser. No. 11/481,112, which was filed on Jul. 5, 2006 now U.S. Pat. No. 7,704,178.

BACKGROUND OF THE INVENTION

This invention relates to an oil baffle arrangement for use in an epicyclic gear train employed to drive a turbo fan.

Gas turbine engines typically employ an epicyclic gear train connected to a turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

The epicyclic gear train gears must receive adequate lubrication during operation of the turbine engine. To this end, the carrier includes oil spray bars arranged between the intermediate gears and the sun gear to spray oil directly on those gears. Separate oil baffles, which may be integral with or separate from the carrier, are arranged between the intermediate gears to collect the sprayed oil and retain it in the area of the intermediate gears for prolonged lubrication before the oil is collected in a lubricant gutter associated with the ring gear.

Prior art carrier arrangements have required multiple components and complicated assembly in order to accommodate the oil baffles. For example, one or both of the side walls of the carrier must be assembled around the intermediate gears resulting in a multi-piece carrier. Furthermore, separate oil spray bars and oil baffles complicate assembly and increase cost. What is needed is a simplified oil baffle and spray bar arrangement that enables a simpler and less expensive carrier design.

SUMMARY OF THE INVENTION

A turbine engine includes a epicyclic gear train that drives a turbo fan. A carrier provides a unitary structure having spaced apart walls interconnected by circumferentially spaced mounts providing circumferentially spaced apertures at an outer circumference of the carrier. The carrier supports intermediate gears that surround and mesh with a centrally located sun gear. The intermediate gears extend through the apertures to mesh with a ring gear that surrounds the carrier. Baffles are arranged between the side walls adjacent to the mounts. Fasteners secure the baffles, which can be a different material than the carrier, to the carrier. The baffles include a lubrication passage that distributes oil to various parts of the epicyclic gear train.

These and other features of the present invention can be best understood from the following specification and drawings, the following of which is a brief description.

DETAILED DESCRIPTION OF THE PREFERRED EMBODIMENT

Figure 1:
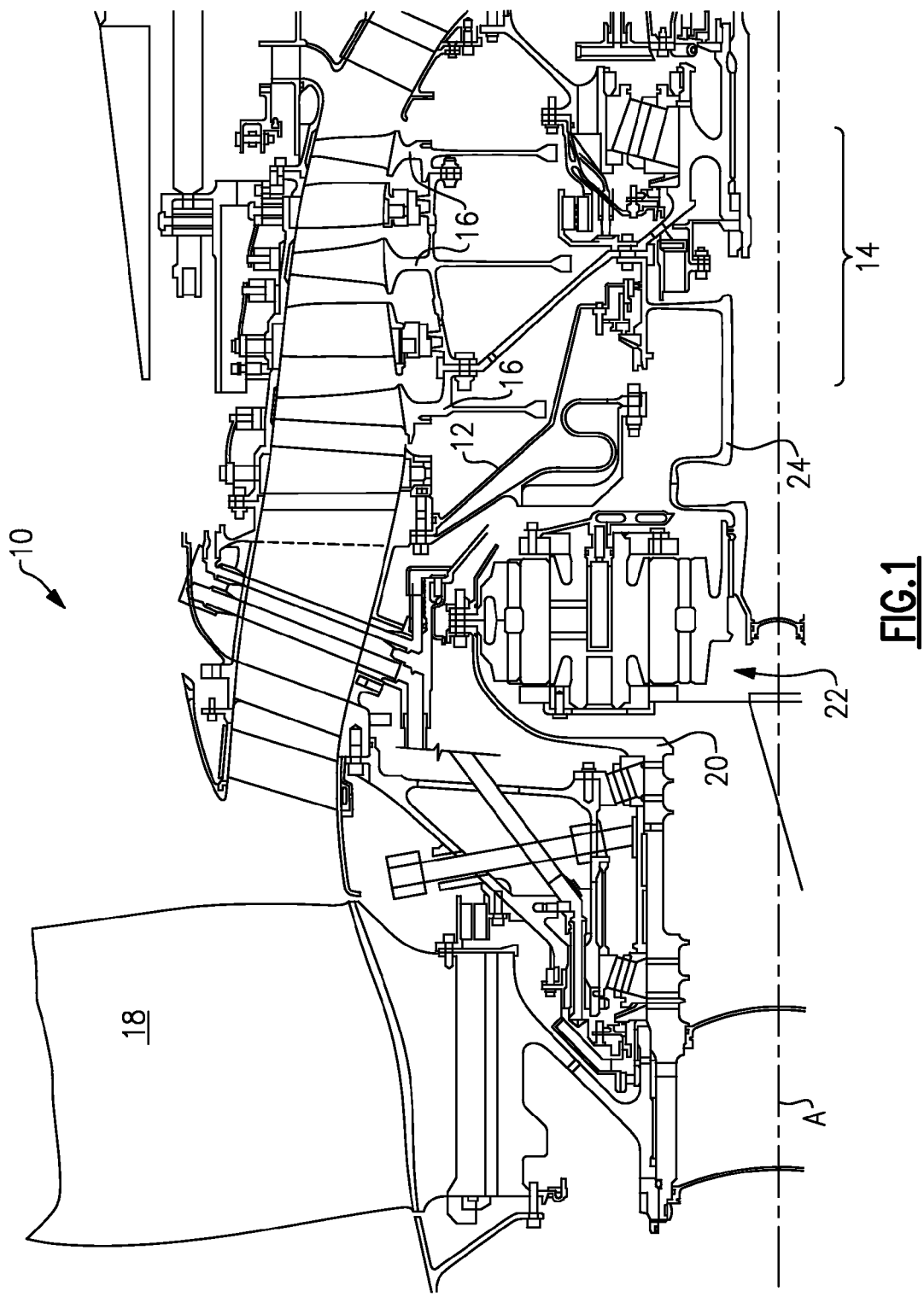
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft (not shown) about an axis A. A turbo fan 18 is supported on a turbo fan shaft 20 that is driven by a compressor shaft 24, which supports the compressor hubs 16, through an epicyclic gear train 22.

Figure 2:
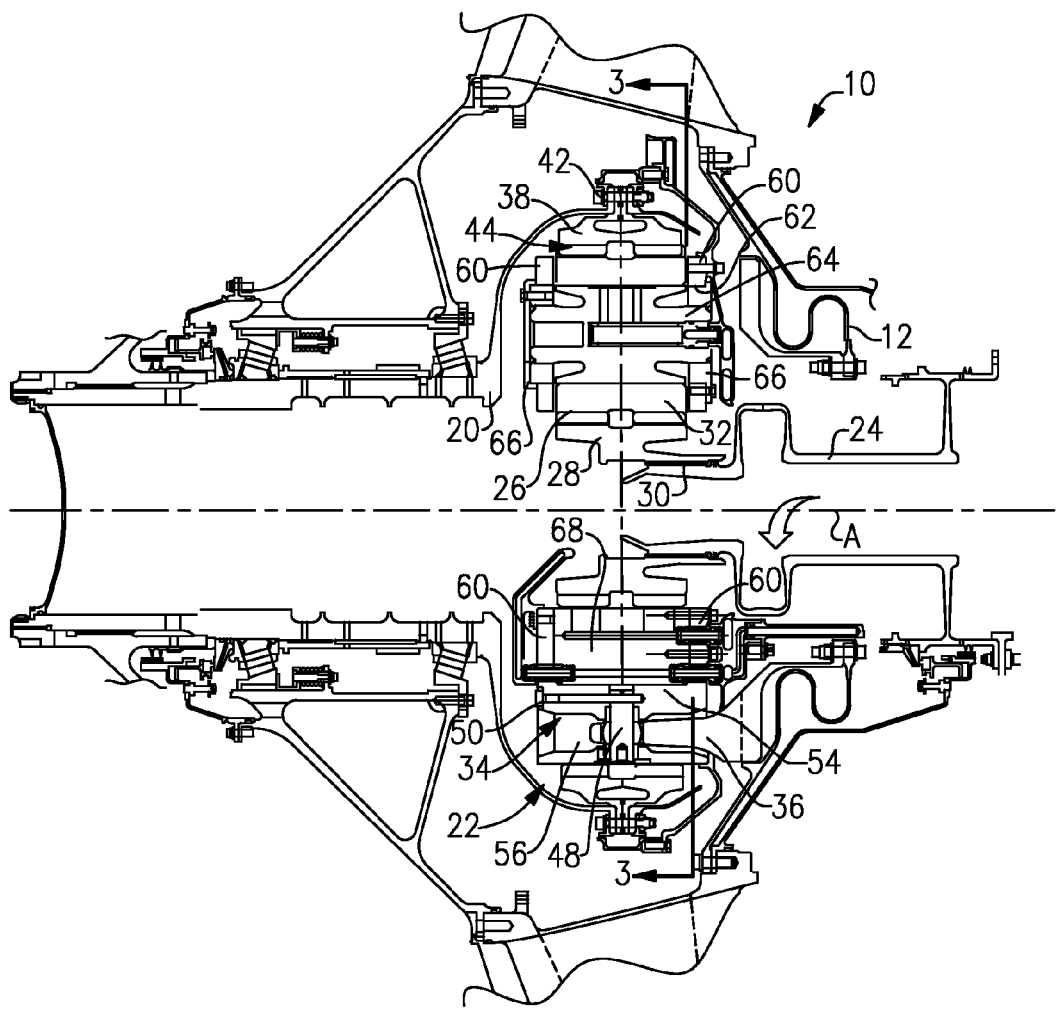
FIG. 2 is a cross-sectional view of the epicyclic gear train shown in FIG. 1.

In the example arrangement shown, the epicyclic gear train 22 is a star gear train. Of course, the claimed invention also applies to other epicyclic gear trains such as a planetary arrangement. Referring to FIG. 2, the epicyclic gear train 22 includes a sun gear 28 that is connected to the compressor shaft 24, which provides rotational input, by a splined connection 30. A carrier 34 is fixed to the housing 12 by a torque frame 36. The carrier 34 supports intermediate gears (which are star gears 32 in the arrangement shown) that are coupled to the sun gear 28 by meshed interfaces 26 between the teeth of the sun and star gears 28, 32. A ring gear 38 surrounds the carrier 34 and is coupled to the star gears 32 by meshed interfaces 44. The ring gear 38, which provides rotational output, is secured to the turbo fan shaft 20 by connection 42.

Figure 3:
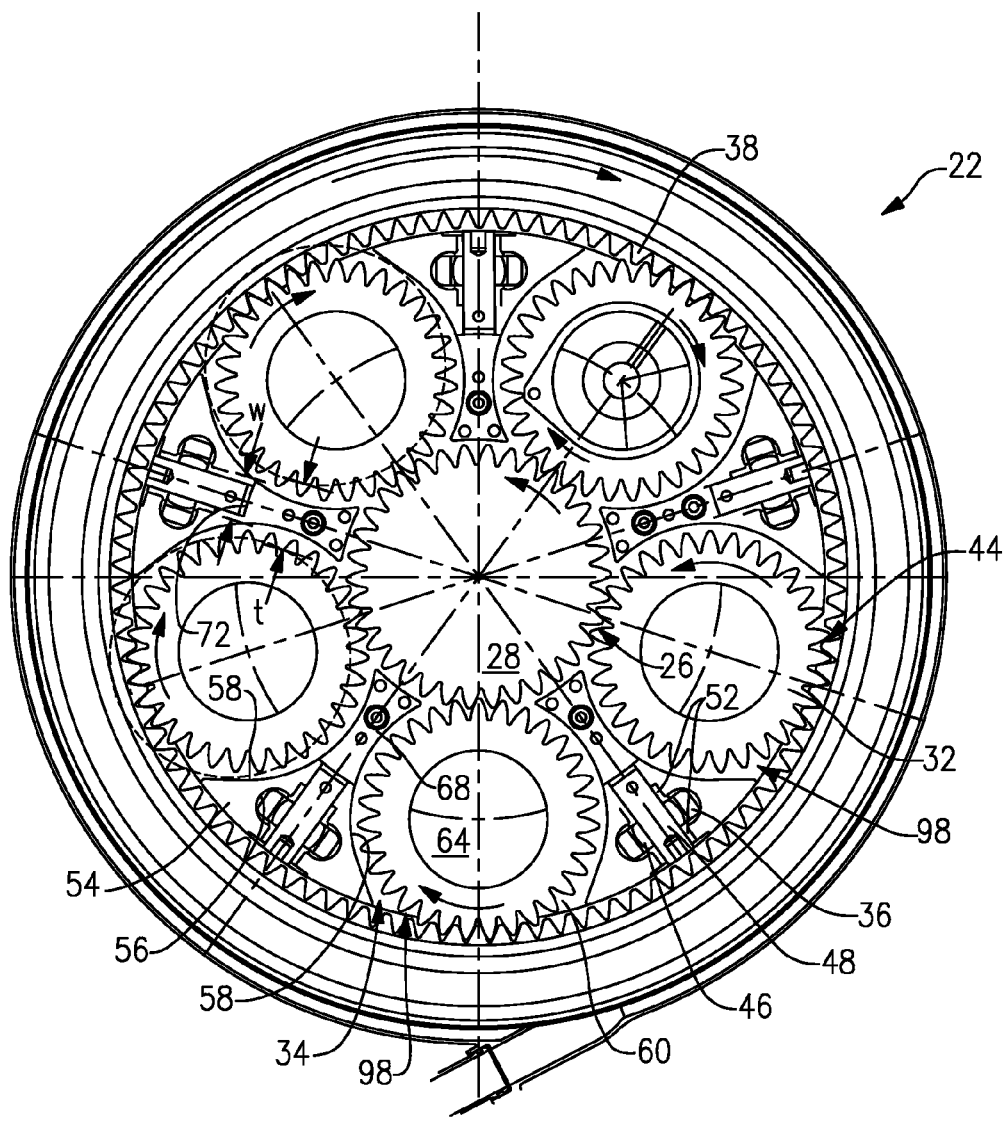
FIG. 3 is an end view of the epicyclic gear train taken along line 3-3 in FIG. 2 with a pair of star gears shown in phantom in an installation position.

In one example, the torque frame 36 grounds the carrier 34 to the housing 12 in a known manner. For example, mounts 53 have apertures 56 receiving fingers of the torque frame 36, as shown in FIGS. 2 and 3. Pins 48 that extend through spherical bearings 46 and bushings 52 secure the fingers to the carrier 34. Fasteners 50 retain the pins 48 to the carrier 34.

The carrier 34 is a unitary structure manufactured from one piece for improved structural rigidity and ease of assembly. The carrier 34 includes spaced apart side walls 60 that are interconnected by the mounts 54, which are generally wedge-shaped members, as best shown in FIG. 3. The mounts 54 and side walls 60 are unitary with one another. The mounts 54 have opposing curved surfaces 58 that are in close proximity to the star gears 32 and generally follow the curvature of the teeth of the star gears 32 so that any oil on the curved surfaces 58 will likely find its way to the star gears 32 for additional lubrication.

The mounts 54 are circumferentially spaced about the carrier 34 to provide apertures 98 through which the star gears 32 extend to engage the ring gear 38. Returning to FIG. 2, the side walls 60 include holes 62 for receiving a journal bearing 64 that supports each of the star gears 32. Each journal bearing 64 is retained within the carrier 34 by retainers 66 fastened to the side walls 60.

Figure 4:
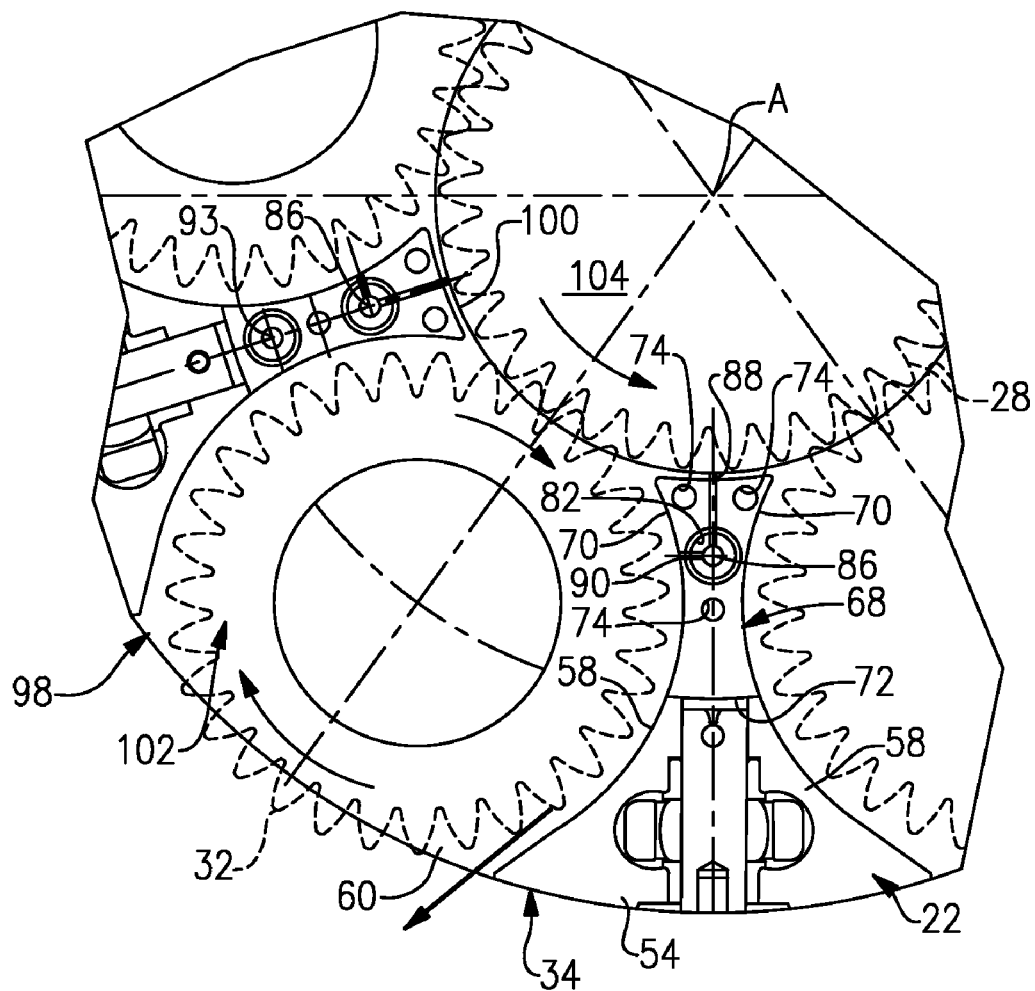
FIG. 4 is an enlarged view of a portion of the epicyclic gear train shown in FIG. 3 with a sun gear and star gears shown in phantom.
Figure 5:
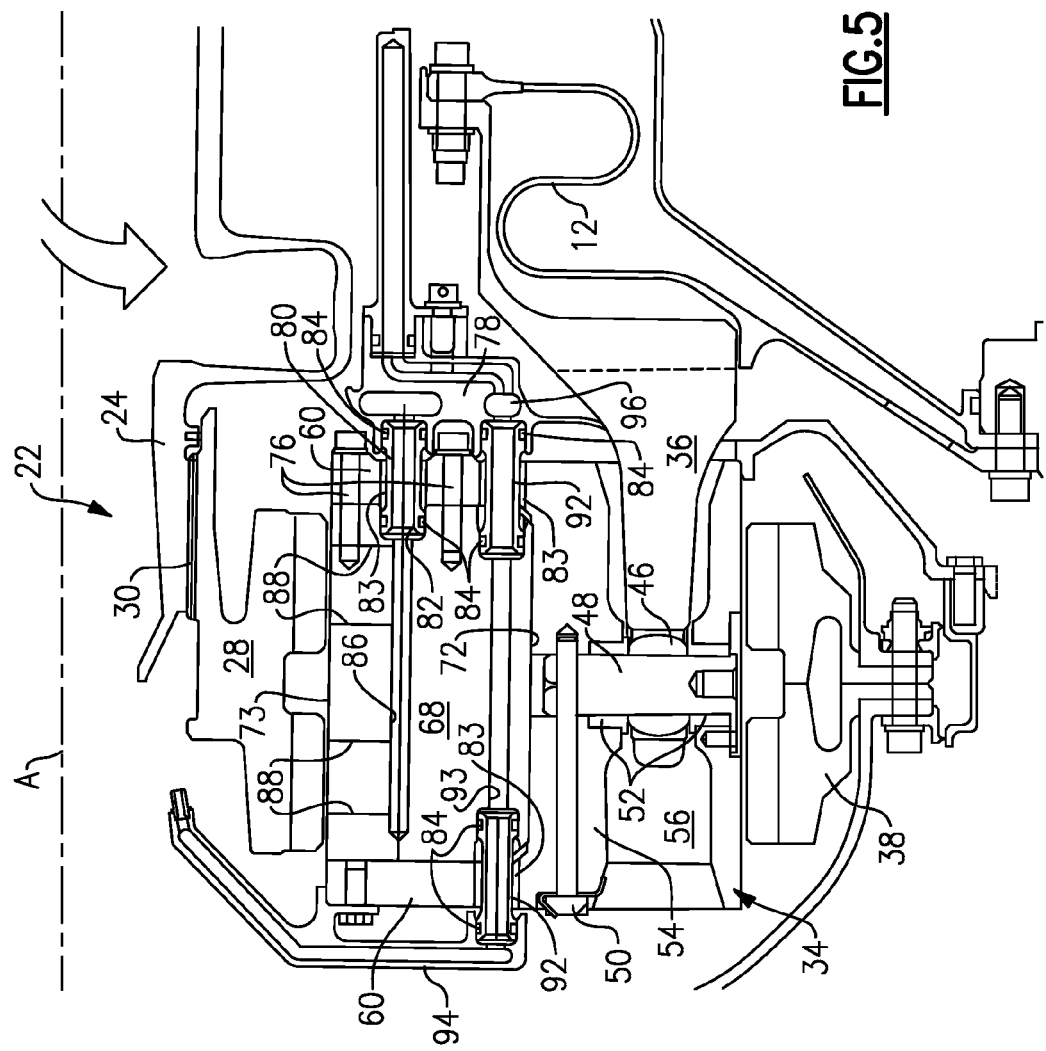
FIG. 5 is an enlarged view of a portion of the epicyclic gear train shown in FIG. 2.

Oil baffles 68 are arranged between the side walls 60 near each of the mounts 54, best shown in FIG. 2. Referring to FIGS. 4 and 5, the baffles 68 include ends 72 that abut the mounts 54, in the example shown. The baffles 68 also include opposing curved surfaces 70 arranged in close proximity to the star gears 28. The curved surfaces 58, 70 are contiguous with and adjoin one another, in the example shown, and provide gear pockets 102 that receive the star gears 32. A gear pocket 104, which receives the sun gear 28, is also provided between a surface 73 on each of the baffles 68 opposite the ends 72.

In one example, one of the side walls 60 includes holes 74 that receive fasteners 76 which secure each of the baffles 68 to the carrier 34. The baffles 68 include a lubrication passage provided by a primary passage 86 that fluidly communicates with a lubricant distributor 78. The lubricant distributor 78 is fed oil from a lubricant supply 96. In one example, the baffles 68 include openings 82 that receive a tube 80 extending through a hole 83 in the side wall 60. Seals 84 seal the tube 80 to the opening 82 and lubricant distributor 78. Other tubes 92 having seals 84 are used to provide oil to an external spray bar 94 through another lubrication passage (spray bar passage 93 that extends through one of the baffles 68). The external spray bar 94 is secured to the carrier 34 and sprays oil in the vicinity of the sun gear 28 near the splined connection 30 (shown in FIGS. 2 and 5).

The primary passage 86 is in communication with first and second passages 88, 90 that spray oil on the teeth of the sun and star gears 28, 32. In the example shown, the first and second passages 88, 90 are arranged ninety degrees from one another.

With the example baffles 68, lubricant distribution is integrated into the baffle so that separate components are eliminated. The baffles 68 can be constructed from a different, lighter weight material than the carrier 34.

The example carrier 34 can be constructed from one piece, which improves the structural integrity of the carrier. A central opening 100 is machined in at least one of the side walls 60 and provides the gear pocket 104. Gear pockets 102 are machined between the side walls 60 and mounts 54 for each of the star gears 32 and form apertures 98 at an outer circumference of the carrier 34. Referring to FIG. 3, the star gears 32 are inserted into the central opening 100 and moved radially outwardly so that they extend through the apertures 98 and are preferably in abutment with the mounts 54 (position indicated by dashed lines in FIG. 3). In this position, there is an adequate gap, t, between the teeth of adjacent star gears 32 to accommodate a width, w, of the end 72 of the baffles 68. Once the baffles 68 have been inserted, the star gears 32 can be repositioned, as shown by the solid lines, and the sun gear 28 can be inserted into the central opening 100 so that it meshes with the star gears 32. The baffles 68 are secured to the carrier 34 using fasteners 76. The tubes 80, 92 can be inserted and the rest of the lubricant distribution system can be connected.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of assembling an epicyclic gear train comprising the steps of:
    a) providing a carrier that includes spaced apart walls and circumferentially spaced mounts interconnecting the walls in a one-piece unitary structure, spaced apart apertures provided between the mounts at an outer circumference of the carrier, gear pockets provided between the walls and mounts extending to the apertures, and a central opening in at least one of the walls;
    b) inserting an intermediate gear through the central opening;
    c) moving the intermediate gear radially into the gear pocket to extend through the aperture;
    d) inserting a baffle into the carrier in a space between the walls subsequent to performing steps a) and b); and
    e) inserting a sun gear through the central opening to intermesh with the intermediate gear.

2. The method according to claim 1, wherein step d) includes securing the baffle to the carrier near the intermediate gear.

3. The method according to claim 2, wherein step d) includes bolting the baffle to one of the walls.

4. The method according to claim 1, comprising inserting a tube through a hole in the carrier to communicate with a lubrication passage in the baffle.

5. The method according to claim 1, comprising securing a torque frame to the mounts, the torque frame fixed relative to a housing.

* * * * *